3,773,911
PROCESS FOR PRODUCING SODIUM SULPHATE
Giorgio Cozza, Luigi Piccolo, and Gabriele Bottai, Milan, Italy, assignors to Societá Italiana Resine S.p.A., Milan, Italy
No Drawing. Filed Nov. 18, 1971, Ser. No. 200,223
Claims priority, application Italy, Nov. 26, 1970, 32,208–A/70
Int. Cl. C01d 5/00; C01g 49/00
U.S. Cl. 423—551                                                       6 Claims

ABSTRACT OF THE DISCLOSURE

Sodium sulphate is produced from ferrous sulphate heptahydrate by reacting with sodium hydroxide in solution to give a sodium sulphate content of 22 to 28% in the presence of carbon dioxide.

---

The present invention relates to improvements in the production of sodium sulphate and more particularly to a process for producing sodium sulphate of improved purity from ferrous sulphate.

Still more particularly, the present invention relates to a process for producing improved purity sodium sulphate from waste products consisting essentially of ferrous sulphate heptahydrate obtained in the production of titanium dioxide from ilmenite via the sulphate. In view of the limited use of such ferrous sulphate heptahydrate, particularly by virtue of the high content of impurities, and the fact that its direct disposal causes considerable pollution, it is necessary to convert it to products which do not have disposal disadvantages and preferably useful products.

Ferrous sulphate heptahydrate may be converted by treatment with sodium hydroxide to form sodium sulphate and a product which can be disposed of directly without danger of chemical pollution, consisting essentially of ferrous hydrate.

The sodium sulphate which is thus produced can be usefully employed in the paper making industry, the extractive chemicals industry, in the preparation of auxiliary products in the textiles industry, and in the artificial textile fibres and detergents industries. The sodium sulphate produced from ferrous sulphate heptahydrate, obtained as a by-product in the process to produce titanium dioxide from ilmenite via the sulphate, is however not directly usable in those cases, for example the glass-making industry and above all the pharmaceuticals industry, for which a very high degree of purity is required. For this purpose, the sodium sulphate produced from ferrous sulphate heptahydrate would need to be subjected to numerous purification treatments which are economically ill-advised by virtue of their troublesome nature.

An object of the present invention is to provide a process by which it is possible directly to convert ferrous sulphate into sodium sulphate of very high purity suitable for example for use in the glass making industry and particularly in the pharmaceuticals industry.

Another object of the present invention is the production of sodium sulphate having the aforementioned purity requirements, from ferrous sulphate which is obtained as a by-product of the process of producing titanium dioxide via ilmenite via the sulphate.

A further object of the present invention is a simple and economically advantageous process by which it is possible to produce sodium sulphate having the aforementioned purity requirements.

This process consists essentially in supplying to an agitated vessel ferrous sulphate and an aqueous solution comprising sodium hydroxide in a quantity such that, when reaction is completed, a concentration of $Na_2SO_4$ of between 22% and 28% by weight is achieved, together with carbon dioxide, in separating the iron precipitated from the aqueous solution, in adding to the residual solution sodium hydroxide so as to cause precipitation of sodium sulphate, and in recovering the precipitated sodium sulphate.

The essential aspect of the present invention is the supplying of ferrous sulphate and the solution comprising sodium hydroxide in a quantity such as to achieve, at completion of reaction, a concentration of $Na_2SO_4$ comprised between 22% and 28% by weight and preferably 24% and 26% by weight, at a temperature preferably comprised between 60 and 100° C., together with carbon dioxide in a quantity less than that stoichiometrically necessary to form ferrous carbonate.

More precisely, the carbon dioxide is added in a quantity such as to supply a molar ratio of carbon dioxide: ferrous sulphate comprised between 0.2:1 and 0.7:1 and preferably 0.4:1 to 0.6:1.

In carrying out the operation continuously, the ferrous sulphate and sodium hydroxide are supplied to the reactor in such a way as to have a pH value of between 8 and 12 and preferably between 9 and 11, with the carbon dioxide, and with the temperature within the above-specified limits.

In this way, an essentially complete separation of the iron and other impurities present is achieved, in the form of an easily filtered precipitate. The filtration operations are particularly facilitated, above all in relation to the rate of filtration, which increases substantially.

The characteristics of filterability of the precipitate obtained increase by raising the molar ratio of carbon dioxide to ferrous sulphate heptahydrate up to a maximum value of 0.7:1 beyond which no appreciable advantages are achieved.

However, it must not be thought that the improvement in the filterability characteristics of the precipitate is due to a regular variation of the chemical nature of the precipitate itself, in that it has been surprisingly found that when increasing the molar ratio of $CO_2$ to ferrous sulphate heptahydrate, it is virtually impossible in the precipitate to obtain molar ratios of ferrous carbonate to ferrous hydrate in excess of approximately 0.25:1. In continuous working sodium hydroxide is added to the solution remaining after precipitation of the iron so as to cause precipitation of part of the sodium sulphate, which is separated, while the residual solution is recycled to the ferrous sulphate reactor vessel.

More precisely, the solution remaining after precipitation of the iron has added to it a solution of sodium hydroxide in a concentration and quantity such as will maintain in the liquid phase a ratio by weight of sodium hydroxide to sodium sulphate which is comprised between 0.16:1 and 17.5:1.

The precipitated sodium sulphate can be separated by the ordinary methods known in the prior art, such as for example by using a centrifuge, while the mother liquor is resupplied continuously to the reactor vessel after any necessary addition of sodium hydroxide.

Particularly advantageous results are obtained if the ferrous sulphate reactor is supplied with waste products obtained in the production of titanium dioxide from ilmenite via the sulphate.

Such products, constituted essentially by ferrous sulphate heptahydrate, are of limited use, particularly by reason of their high content of other compounds which cannot be economically isolated.

Furthermore, the direct disposal of such products causes considerable pollution.

By proceeding according to the process of the present invention, it is very simple and economically convenient to obtain from such waste products, with yields ranging from 90 to 99%, substantially pure sodium sulphate and a product which can be disposed of directly with no danger of chemical pollution, and which consists essentially of ferrous hydrate and ferrous carbonate.

The invention will now be illustrated by the following examples, which do not however constitute any limitation on the invetion itself.

EXAMPLE 1

Into a three-necked vessel fitted with an agitator, a solution containing NaOH and $Na_2SO_4$ at the rate of 12.10% and 10.68% by weight respectively and ferrous sulphate heptahydrate originating from the processing of ilmenite, were introduced in quantities sufficient to achieve after completion of reaction of the ferrous sulphate with the NaOH, a concentration of $Na_2SO_4$ equal to 25% by weight.

The ferrous sulphate heptahydrate had a ferrous ion content equal to 18% and a sulphate ion content equal to 32%. Under these conditions, the resultant pH was equal to 9 and the reaction was carried out at 100° C.

The rate of supply of ferrous sulphate heptahydrate was equal to 0.5 kg./h. When supply was completed, the cloudiness was allowed to settle for 30 minutes after which the material was subjected to filtration on a standard filter with a filtering gauze of steel mesh with a rubber seal.

A mechanical pump ensured a residual pressure equal to 20 mm. Hg. If the layer which forms on the filter is 19 mm. thick, this denotes a specific filtration throughout of 43 kg./sq.m./h.

To the filtrate was then added an aqueous solution of 50% sodium hydroxide, in a vessel maintained at 80° C. The addition was carried out in such a way as to regenerate the reaction solution for the ferrous sulphate heptahydrate. The precipitated sodium sulphate, separated by a centrifuge, after washing in a solution containing sodium sulphate followed by drying, resulted on analysis to have the following contents:

| | P.p.m. |
|---|---|
| Fe | 4 |
| Ca | <0.5 |
| Mn | <2 |
| Cr | <0.5 |
| Al | <0.5 |
| Mg | 1.5 |
| Ti | <1 |

The yield of sodium sulphate equalled 92%.

EXAMPLE 2

The same procedure was used as for Example 1, in contrast to which however, together with the reaction solution containing NaOH and $Na_2SO_4$, carbon dioxide was also supplied with the ferrous sulphate heptahydrate in such a quantity as to supply a molar ratio of carbon dioxide:ferrous sulphate heptahydrate equal to 0.2:1.

The specific throughput under filtration in this case equalled 129 kg./sq.m./h. In terms of the precipitate obtained, the molar ratio of ferrous carbonate to ferrous hydrate was determined as being equal to 0.13:1.

The filtrate was subsequently subjected to operations as in Example 1 and, finally, sodium sulphate was obtained which was analysed as having the following contents:

| | P.p.m. |
|---|---|
| Fe | 3.0 |
| Ca | <0.5 |
| Mn | <0.5 |
| Cr | <0.5 |
| Al | <0.5 |
| Mg | 0.8 |
| Ti | <1 |

The yield of sodium sulphate was better than 99%.

EXAMPLE 3

The same procedure was followed as in Example 2, carbon dioxide being supplied in such a quantity as to achieve a molar ratio of carbon dioxide to ferrous sulphate equal to 0.4:1.

The specific filtration throughput in this case equalled 160 kg./sq.m./hr.

The molar ratio of ferrous carbonate to ferrous hydrate in the precipitate in this case proved equal to 0.22:1.

The sodium sulphate finally obtained showed, on analysis, a content of:

| | P.p.m. |
|---|---|
| Fe | 2 |
| Ca | <0.5 |
| Mn | <0.5 |
| Cr | <0.5 |
| Al | <0.5 |
| Mg | <0.5 |
| Ti | <1 |

The yield of sodium sulphate was better than 99%.

EXAMPLE 4

The procedure adopted was as in Example 2, carbon dioxide being supplied in such a quantity as to have a molar ratio of carbon dioxide:ferrous sulphate heptahydrate equal to 0.6:1.

The specific throughout of filtration in this case was equal to 177 kg./sq.m./h.

The molar ratio of ferrous carbonate to ferrous hydrate in the precipitate in this case proved equal to 0.24:1.

Upon analysis, the sodium sulphate finally obtained proved to contain:

| | P.p.m. |
|---|---|
| Fe | 2 |
| Ca | <0.5 |
| Mn | <0.5 |
| Cr | <0.5 |
| Al | <0.5 |
| Mg | 0.7 |
| Ti | <1 |

The yield of sodium sulphate was equal to approx. 98.5%.

EXAMPLE 5

The procedure was carried out according to Example 2, carbon dioxide being supplied in such a quantity as to have a molar ratio of carbon dioxide to ferrous sulphate heptahydrate equal to 1:1.

The specific throughput of filtration in this case proved equal to 196 kg./sq.m./hr.

The molar ratio of ferrous carbonate to ferrous hydrate in the precipitate in this case proved to equal 0.25:1.

When analysed, the sodium sulphate finally obtained had contents of:

| | P.p.m. |
|---|---|
| Fe | 4 |
| Ca | <0.5 |
| Mn | <0.5 |
| Cr | <0.5 |
| Al | <0.5 |
| Mg | 1 |
| Ti | <1 |

The yield of sodium sulphate was equal to approx. 98.5%.

What we claim is:

1. A process for producing substantially pure sodium sulphate from ferrous sulphate obtained as a waste product in the production of titanium dioxide from ilmenite via sulphate, said ferrous sulphate essentially contained in the heptahydrate form, which comprises:
   (1) supplying ferrous sulphate, an aqueous solution of sodium hydroxide and carbon dioxide to an agitated vessel at atmospheric pressure and at a temperature of between 60° and 100° C., whereby ferrous carbonate, sodium sulphate having a concentration of from 22% to 28% by weight and precipitated iron as ferrous hydrate are obtained, the molar ratio of said carbon dioxide to ferrous sulphate ranging from 0.2:1.0 to 0.7:1.0,
   (2) separating the precipitated iron from Step (1) from the aqueous solution,
   (3) adding to the residual solution, sodium hydroxide in an amount sufficient to initiate precipitation of sodium sulphate,
   (4) recovering the precipitated sodium sulphate, and
   (5) subsequently, washing and drying, respectively, the recovered precipitated sodium sulphate,
   said addition of carbon dioxide serving to completely and selectively separate the iron content and other impurities in the form of an easily filtered precipitate so that upon the addition of sodium hydroxide to the residual solution, a precipitated, relatively pure sodium sulphate product is subsequently obtained.

2. The process of claim 1, wherein the ferrous sulphate and the solution comprising sodium hydroxide are supplied in an amount such that when the reaction is complete, a concentration of sodium sulphate is achieved which will range from 24% to 26% by weight and wherein said carbon dioxide is present in a molar ratio to said ferrous sulphate of between 0.2:1.0 to 0.6:1.0.

3. The process of claim 1, wherein said ferrous sulphate and said aqueous solution containing said sodium hydroxide are supplied to the reaction vessel in such a manner as to exhibit a pH of from 8 to 12.

4. The process of claim 3, wherein said pH ranges from 9 to 11.

5. The process of claim 3, wherein the molar ratio of said carbon dioxide to ferrous sulphate ranges from 0.4:1.0 to 0.6:1.0.

6. The process of claim 1, wherein the aqueous solution containing sodium hydroxide is the solution remaining after precipitation of said sodium sulphate, with the addition of sodium hydroxide in a concentration sufficient to maintain in the liquid phase, a portion by weight of sodium hydroxide to sodium sulphate ranging from 0.16:1.0 to 17.5:1.0.

References Cited

UNITED STATES PATENTS 3,706,531   12/1972   Cozza et al. .......... 423—551

FOREIGN PATENTS 879,260   2/1943   France .............. 23—121

OTHER REFERENCES

C. A. Jacobson's book "Encyclopedia of Chemical Reactions," vol. 4, 1951 ed., p. 89, Reinhold Pub. Corp., New York.

H. Remy's book "Treatise on Inorganic Chemistry," vol. II, 1956 ed., p. 279, Elsevier Pub. Co., New York.

EDWARD STERN, Primary Examiner

U.S. Cl. X.R.

423—179, 186, 209